US009210654B2

(12) United States Patent
Robertson et al.

(10) Patent No.: US 9,210,654 B2
(45) Date of Patent: Dec. 8, 2015

(54) TELECOMMUNICATIONS SYSTEM AND METHOD

(71) Applicant: MULTITONE ELECTRONICS PLC, Hampshire (GB)

(72) Inventors: Robert Robertson, Berkshire (GB); Andrew Lewis, Hampshire (GB)

(73) Assignee: Multitone Electronics PLC, Basingstoke Hampshire (GB)

( * ) Notice: Subject to any disclaimer, the term of this patent is extended or adjusted under 35 U.S.C. 154(b) by 61 days.

(21) Appl. No.: 13/950,065

(22) Filed: Jul. 24, 2013

(65) Prior Publication Data

US 2014/0029497 A1 Jan. 30, 2014

Related U.S. Application Data

(63) Continuation of application No. 12/597,149, filed on Aug. 20, 2010, now Pat. No. 8,542,806.

(51) Int. Cl.

| | |
|---|---|
| *H04W 72/04* | (2009.01) |
| *H04W 52/02* | (2009.01) |
| *H04B 7/155* | (2006.01) |
| *H04B 7/26* | (2006.01) |
| *H04W 88/04* | (2009.01) |

(52) U.S. Cl.
CPC ........... *H04W 52/0203* (2013.01); *H04B 7/155* (2013.01); *H04B 7/2606* (2013.01); *H04W 72/0446* (2013.01); *H04W 88/04* (2013.01)

(58) Field of Classification Search
CPC . H04W 72/0446; H04W 24/00; H04W 74/04; H04W 88/08; H04W 48/12; H04L 12/5695; H04L 47/805; H04L 47/822; H04L 47/15
See application file for complete search history.

(56) References Cited

U.S. PATENT DOCUMENTS

| 6,741,554 B2 | 5/2004 | D'Amico et al. |
| 6,925,134 B1 | 8/2005 | Lo et al. |
| 7,177,645 B2 * | 2/2007 | Goldhamer .................. 455/447 |

(Continued)

FOREIGN PATENT DOCUMENTS

| EP | 0637144 A1 | 1/1995 |
| EP | 1739993 A1 | 1/2007 |

(Continued)

OTHER PUBLICATIONS

"Part 16: Air Interface for Fixed Broadband Wireless Access Systems", IEEE Standard for Local and metropolitan area networks, XP-002359227, IEEE Std 802.16-2004, pp. 139-151, Oct. 1, 2004.

*Primary Examiner* — Fan Ng
(74) *Attorney, Agent, or Firm* — Haverstock & Owens LLP (57) ABSTRACT

A telecommunications system including a plurality of repeater nodes, each repeater node having a transceiver unit operable to transmit and receive data to or from one or more other of the repeater nodes or a control node or a mobile device within a predetermined range. The control node operable to transmit data to and receive data from the mobile device via the repeater nodes using a time frame divided into a plurality of time slots. The time slots of the time frame are allocated to the repeater nodes to the effect that each repeater node transmits to another repeater node in one of the upstream or the downstream directions in a time slot which is a minimal time from the time slot in which the other repeater node transmits in the upstream or downstream direction.

10 Claims, 9 Drawing Sheets

(56) References Cited

U.S. PATENT DOCUMENTS

| | | | |
|---|---|---|---|
| 8,422,481 B2* | 4/2013 | Hanuni et al. | 370/348 |
| 8,588,145 B2* | 11/2013 | Yoon et al. | 370/329 |
| 2004/0032853 A1 | 2/2004 | D'Amico et al. | |
| 2005/0036470 A1 | 2/2005 | Calvert | |
| 2007/0064619 A1* | 3/2007 | Bettis et al. | 370/252 |
| 2007/0098009 A1* | 5/2007 | Du et al. | 370/445 |
| 2008/0056172 A1* | 3/2008 | Nakatsugawa | 370/315 |
| 2008/0268855 A1* | 10/2008 | Hanuni et al. | 455/445 |
| 2010/0302993 A1* | 12/2010 | Robertson et al. | 370/315 |

FOREIGN PATENT DOCUMENTS

| | | |
|---|---|---|
| GB | 2322525 A | 8/1998 |
| JP | 8056216 A | 2/1996 |

* cited by examiner

TELECOMMUNICATIONS SYSTEM AND METHOD

RELATED APPLICATION(S)

The present application is a continuation of co-pending U.S. patent application Ser. No. 12/597,149, filed Aug. 20, 2010, and entitled "TELECOMMUNICATIONS SYSTEM AND METHOD," which is hereby incorporated by reference.

FIELD OF THE INVENTION

The present invention relates to a system and method for communicating data to and from a mobile device to and from a control node via a plurality of repeater nodes.

BACKGROUND OF THE INVENTION

The use of repeater nodes in telecommunication networks is well known. Typically the repeater nodes are stationed between a source node and a destination node and allow for data communicated from the source node to the destination node to be transmitted over a distance that would otherwise be too great to maintain an acceptable signal quality if communication was made without the repeater nodes. A first repeater node conventionally receives the data being transmitted from the source node, performs any amplification which may be necessary due to a degradation of the signal, and transmits the amplified signal on to a second repeater node. The second repeater node in turn performs any amplification which may be necessary due to a degradation of the signal, transmits the amplified signal on to the next repeater node. This process will be repeated until a final repeater node transmits the data to the destination node. Arrangements of the repeater nodes vary depending on what particular system and method is used, however the repeater nodes may typically be arranged in a chain formation.

An advantage of systems that communicate data via repeater nodes is that a distance across which the source node and destination node can communicate can be increased beyond a distance that the source node and destination node would otherwise be able to communicate without the repeater nodes. Also a transmission method used by the repeater nodes for example a radio interface, need only have a maximum range of the distance between the repeater nodes. This might allow for the use of transmission methods such as short range radio interfaces, for example Bluetooth, which may be particularly desirable because of low power consumption and minimal radio interference impact.

However, each repeater node involved in a data path from source node to destination node introduces a finite delay. Such delays arise as each repeater node must receive, process and then transmit the data. The length of the delay is generally dependent on the type of system, the type of repeater used and the method of operation of the repeater. The delay that each repeater introduces into the data path is undesirable in many applications. For example, this might be a particular problem in systems in which alarm signals are transmitted where it is important that transmitted data be received within as shorter period of time as possible.

Prior methods of reducing repeater node delay have included providing each repeater node with two channels such that repeater nodes can receive and transmit data contemporaneously. These channels may for example take the form of an allocated frequency resource or spread spectrum code. According to such methods the repeater nodes can receive and transmit data contemporaneously. However, a repeater node arranged to accommodate two channels increases the cost and complexity of the repeater node and also increases power consumption because both data transmission and reception circuitry may have to be operated concurrently.

SUMMARY OF THE INVENTION

According to the present invention there is provided a telecommunications system, for communicating data to and from a mobile device. The system comprises a plurality of repeater nodes, each repeater node having a transceiver unit operable to transmit and receive data to or from one or more other of the repeater nodes or the control node or the mobile device within a predetermined range. The system also comprises a control node operable to transmit data in a downstream direction from the control node to the mobile device via the repeater nodes and to receive data from the mobile device transmitted in an upstream direction from the mobile device to the control node via the repeater nodes. The control node, the mobile device and the plurality of repeater nodes are arranged to communicate the data in the downstream direction from the control node to the mobile device via the repeater nodes using a time frame divided into a plurality of time slots, and to communicate the data in the upstream direction from the mobile device to the control node via the repeater nodes using the time frame. The time slots of the time frame are allocated to the repeater nodes to the effect that each repeater nodes transmits to another repeater node in one of the upstream or the downstream directions in a time slot which is a minimal time from the time slot in which the other repeater node transmits in the upstream or downstream direction.

Embodiments of the present invention have an advantage in that there is a reduced amount of power consumption associated with each repeater node. This is because each repeater node of the telecommunication system transmits data during its designated time slot. This means that in some cases over a period of time equivalent to a time frame, the repeater nodes that have data to transmit will only be transmitting data for a period of time equivalent to that of one time slot. This minimal period of time transmitting data will lead to a reduced power consumption. This may allow for the possibility of repeater nodes being powered from independent power sources rather than a wired connection to a mains power supply.

Embodiments of the present invention also allow for either the delay in the transmission of downstream data from the control node to the mobile device to be reduced or the delay in the transmission of upstream data from the mobile device to the control node to be reduced. This is because the time slots of a time frame are allocated to the repeater nodes to the effect that each of the repeater nodes transmits data to another repeater node in one of the upstream or the downstream directions in a time slot which is separated by as short a time as possible from the time slot in which the other repeater node transmits in the upstream or downstream direction. In other words, in the case where a time frame is arranged to reduce a delay in the transmission of downstream data, a first and a second repeater node in which the first repeater node transmits downstream data to the second repeater node will be allocated time slots in the time frame which are as close to each other as possible, with the time slot allocated to the first repeater node occurring first in the time frame. In a case in which there are a chain of n repeaters and the delay in the transmission of downstream data is to be reduced, the time slots of the time frame will be allocated such that the first repeater node to transmit downstream data is allocated a time slot first, followed by the second repeater node and then the third repeater node etc, with the nth repeater node being the last to be allocated a time slot. Thus when a given first repeater node transmits its downstream data during its allocated time slot, the next repeater node in the downstream direction receives the downstream data. Having received the downstream data this next repeater node is able to transmit its downstream data in its allocated slot which is immediately after that of the first repeater node. Accordingly a delay in the transmission of downstream data is reduced.

According to embodiments of the present invention, the arrangement of the time frame is such that although it will reduce a delay in the communication of data in one direction this will be done at the expense of a delay incurred in data being communicated in the other direction. For example in an embodiment in which the time frame is organised to minimise a delay in the communication of the downstream data, the delay incurred by the upstream data will be substantially greater as a result of minimising the delay in the downstream direction. As explained above in such an embodiment the time slots are allocated to repeater nodes so that repeater nodes that transmit downstream data from one to another are as close to one another as possible, with the time slots of a first repeater nodes that transmits downstream data to second repeater node being allocated first. However, this arrangement necessarily causes a delay in the transmission of upstream data to be increased. This is because when a repeater node transmits upstream data, the time slot of the repeater node to which it is transmitting upstream data will have already have occurred in the time frame. Thus the transmission of upstream data from one repeater node to another takes at least a period of time equivalent to that of a time frame. Assuming a chain of n repeater nodes, there will be a corresponding n time slots in the time frame. The time frame may also include an additional m timeslots representing time slots allocated to other nodes such as the control node and the mobile device. If each time slot last a period t, the total time period T, of a time frame will be (n+m)t. In some circumstances, it will be possible for data to be transmitted in the favoured direction (which will depend on the arrangement of the time frame) from the first repeater node to the nth repeater node in a period of time (n−1)t. However, in this case the time taken to transmit data in the other direction from the nth repeater node to the first repeater node will be (n−1)T.

Therefore, in some embodiments, the system may be operable to reverse the order of time slots in the time frame. This will have the effect that a choice will be available as to whether to minimise a delay incurred in the communication of upstream data or to minimise a delay incurred in the communication of downstream data. Having a capacity to reverse the order of the time frame would be particularly advantageous in a case where under normal conditions it was appropriate to reduce a delay in the communication of data in one direction but occasionally a situation arose in which over a limited period of time it was more appropriate for data to be transmitted in the other direction with a reduced delay. Alternatively or additionally, the system could be arranged such that over a certain part of a cycle, the order of the time flame is arranged to reduce a delay in downstream data and for the remaining part of the cycle the order of the time frame is reversed to reduce a delay in the transmission of upstream data. Thus the system could be adapted to prioritise upstream or downstream data depending on a characteristic of data traffic which the system experiences.

In some embodiments of the invention the system could be arranged to alternate the order of the time frame every other frame, thus reducing an average round trip delay for data being transmitted to and from the mobile device or the control node or reducing an average delay in upstream and downstream data transmission.

Some embodiments of the present invention provide for repeater nodes of a reduced complexity. During a normal operation of the telecommunications system, each repeater node of the network need only be in a data transmitting mode or a data receiving mode. This is because ordering dictated by the time frame enables each repeater node to determine when to transmit data and when to receive data without any further information from any other repeater node. Therefore reduced complexity transceiver units, capable of only receiving or transmitting at any given time may be used in the repeater nodes. Such transceiver units may also be of a reduced cost and consume less power than more complex transceiver units.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
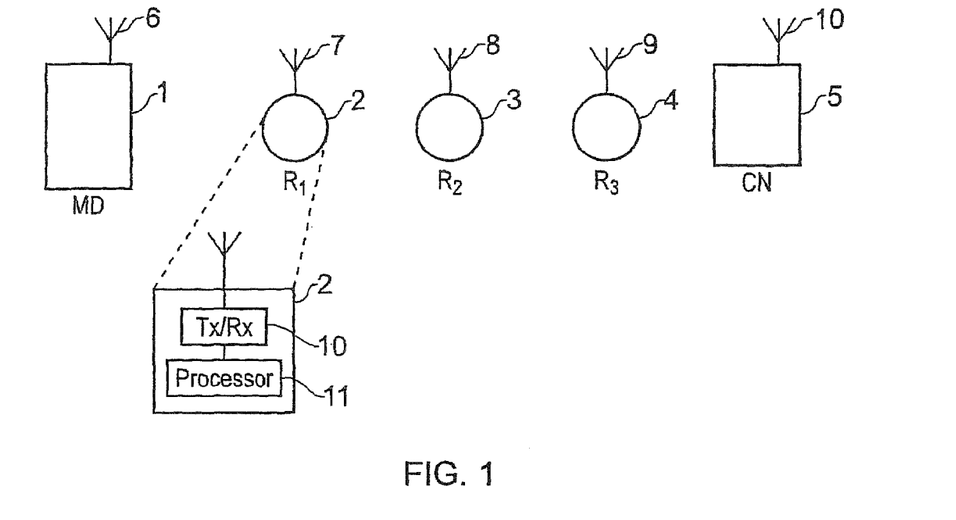
FIG. 1 shows a simplified diagram of a simple telecommunication system arranged in accordance with the present invention.

FIG. 1 shows a diagram of a telecommunications system arranged in accordance with an embodiment of the present invention. The telecommunication system enables the communication of data between a mobile device 1 and a control node 5. Data is transmitted between the control node 5 and the mobile device 1 via a plurality of repeater nodes 2, 3, 4. Data which is transmitted in a direction from the control node 5 to the mobile device 1 is defined as downstream data. Data which travels in an opposite direction, i.e. from the mobile device 1 to the control node 5 is defined as upstream data. Each of the plurality of repeater nodes 2, 3, 4 is provided with a transceiver unit 7, 8, 9 and a processor 11.

Upstream data is transmitted from the mobile device, to the first repeater node 2, which in turn transmits the upstream data to the second repeater node 3, which in turn transmits the upstream data to the third repeater node 4, which in turn transmits the upstream data to the control node 5. Downstream data is transmitted from the control node 5 to the third repeater node 4, which in turn transmits the downstream data to the second repeater node 3, which in turn transmits the downstream data to the first repeater node 2, which in turn transmits the data to the mobile device 1.

Figure 2:
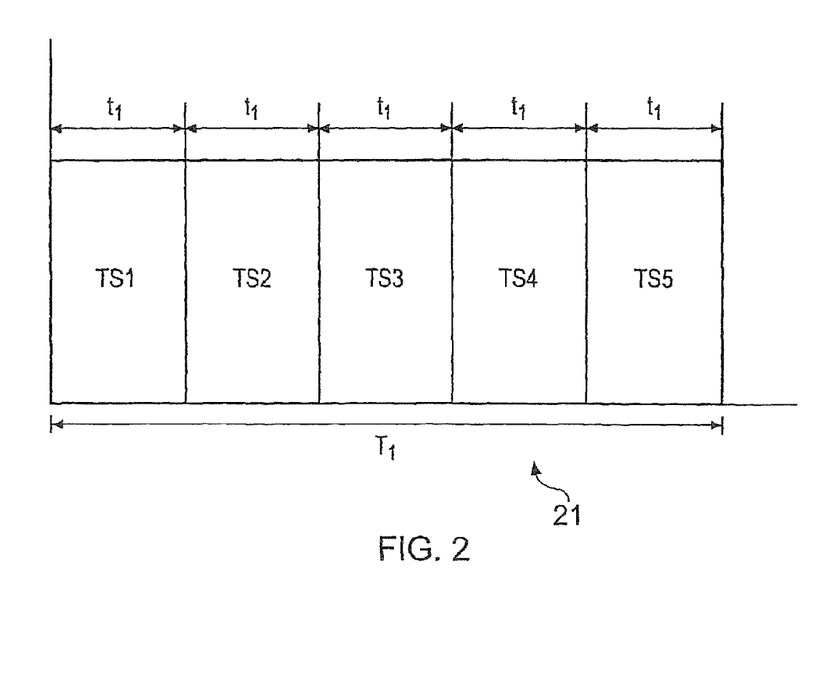
FIG. 2 shows a time frame arranged in accordance with the telecommunication system of claim 1.

FIG. 2 shows a diagram of a time frame 21 according to which the telecommunications system of FIG. 1 communicates upstream data and downstream data. The time frame lasts for a duration of time $T_1$. Each part of the telecommunication system, the control node 5, the mobile device 1 and the plurality of repeater nodes 2, 3, 4 have a corresponding time slot in the time frame 21 which lasts for a period $t_1$. The mobile device has a corresponding time slot TS1, the first repeater node 2 has a corresponding time slot TS2, the second repeater node 3 has a corresponding time slot TS3, the third repeater node 4 has a corresponding time slot TS4, and the control node 5 has a corresponding time slot TS5.

The telecommunication system is arranged such that each part of the telecommunication network will transmit data during its corresponding time slot. Furthermore the time frame is ordered such that the time slots corresponding to the parts of the telecommunication system are arranged to be at a minimal time separation from other parts of the telecommunication to which they transmit upstream and downstream data. Thus in the telecommunication system of FIG. 1, adjacent parts of the network have correspondingly adjacent time slots. For example in the network of FIG. 1, the second repeater node 3 is adjacent to the first repeater node 2 and the third repeater node 4. This is matched in the time frame 21 in that the corresponding time slot TS3 for the second repeater node 3 is adjacent to the time slot TS4 corresponding to the third repeater node 4 and to the time slot TS2 corresponding to the first repeater node 2. An advantage of such an arrangement is that upstream data can be transmitted from the mobile device 1 to the control node 5 with a minimal delay. This will be explained with reference to FIG. 3.

Figure 3:
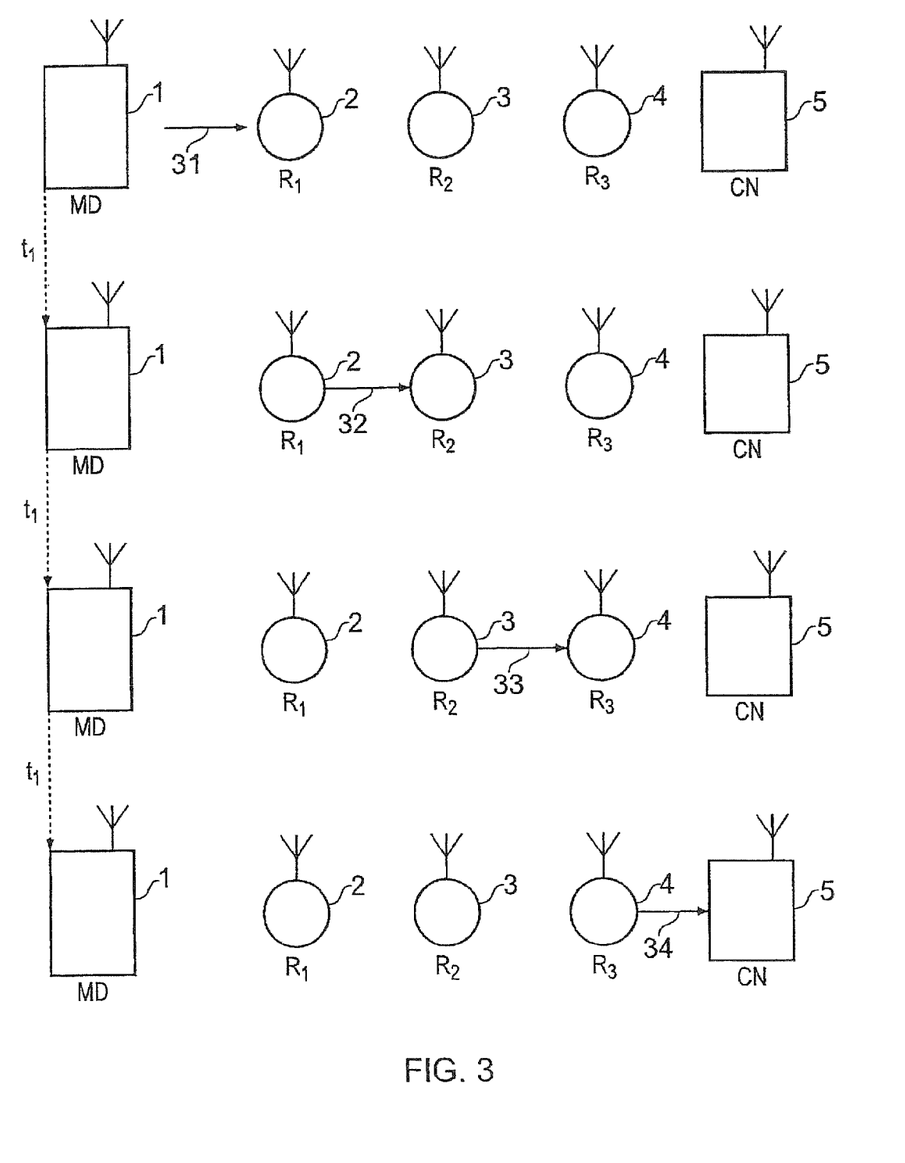
FIG. 3 shows a diagram illustrating the progression of upstream data through the telecommunication system of claim 1.

FIG. 3 illustrates the progression of upstream data from the mobile device 1 to the control node 5 in accordance with the time frame 21. The upstream data originates at the mobile device 1 and is transmitted to the first repeater node 2 during the time slot TS1 corresponding to the mobile device 1. This is shown by a first arrow 31. The upstream data is then transmitted to the second repeater node 3 during the time slot TS2 corresponding to the first repeater node 2. This is shown by a second arrow 32. The upstream data is then transmitted to the third repeater node 4 during the time slot TS3 corresponding to the second repeater node 3. This is shown by a third arrow 33. Finally the upstream data is transmitted to the control node 4 during the time slot TS4 corresponding to the third repeater node 4. This is shown by a fourth arrow 34.

As discussed above, the use of a time frame 21 dictating when each repeater node transmits data can lead to a reduced power consumption for each repeater node. As each repeater node 2, 3, 4 of the telecommunication system transmits data during its designated time slot over a give period of time equivalent to a time frame $T_1$, the repeater nodes that have data to transmit will only be transmitting data for a period of time equivalent to that of one time slot, i.e. $t_1$. This minimal period of time transmitting data can lead to a reduced power consumption. This may allow for the possibility of repeater nodes being powered from independent power sources rather than a wired connection to a mains power supply. This has particular advantage in that the ease with which the repeater nodes can be deployed is increased as additional wiring is not required and a limitation of having to install the repeater nodes near an accessible mains power supply is overcome. The act of installing a repeater node could well be as simple as attaching it to an appropriate surface. In some cases even this may not be necessary as unfixed mobile repeater nodes could be used.

Therefore, the use of repeater nodes may be facilitated which are of a reduced complexity in comparison to repeater nodes used in a system in which the time frame 21 was not used. During a normal operation of the telecommunications system, each repeater node of the network need only be in a data transmitting mode or a data receiving mode. This is because ordering dictated by the time frame 21 enables each repeater node to determine when to transmit data and when to receive data without any further information from any other repeater node. Therefore reduced complexity transceiver units 7, 8, 9, which need only be capable of receiving or transmitting at any given time may be used in the repeater nodes 2, 3, 4. Such transceiver units may also be of a reduced cost and consume less power than more complex transceiver units which might be used in a system in which a time frame was not employed.

As shown in FIG. 3 the period of time taken for the upstream data to be communicated between each part of the network is $t_1$ and the total time taken for the upstream data to be propagated from the mobile device 1 to the control node 5 is the length of one time frame i.e. $T_1$.

However, arranging the time frame 21 such that upstream data is transmitted with a minimal delay is done at the expense of the transmission of downstream data. This will be explained with reference to FIG. 4.

Figure 4:
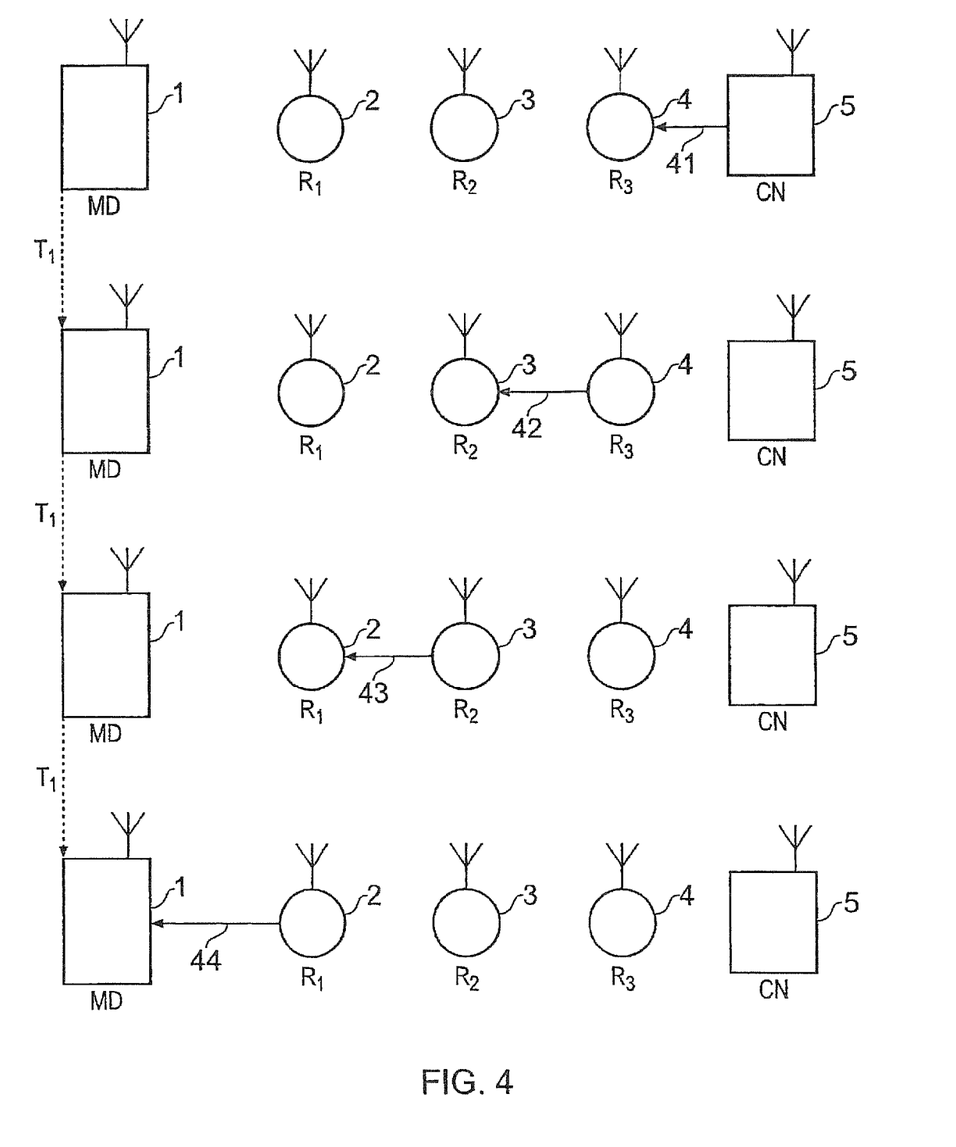
FIG. 4 shows a diagram illustrating the progression of downstream data through the telecommunication system of claim 1.

FIG. 4 illustrates the progression of downstream data from the control node 5 to the mobile device 1 in accordance with the time frame 21. The downstream data originates at the control node 5 and is transmitted to the third repeater node 4 during the time slot TS5 corresponding to the control node 5. This is shown by a first arrow 41. The downstream data is then transmitted to the second repeater node 3 during the time slot TS4 corresponding to the third repeater node 4. This is shown by a second arrow 42. This also applies to the transmission of downstream data for the remaining time slots. The downstream data is then transmitted to the first repeater node 2 during the time slot TS3 corresponding to the second repeater node 3. This is shown by a third arrow 43. Finally the downstream data is transmitted to the mobile device 1 during the time slot TS2 corresponding to the first repeater node 2. This is shown by a fourth arrow 44.

As shown in FIG. 4 the period of time taken for the downstream data to be communicated between each part of the network is $T_1$. This is because downstream data is transmitted according to the same time frame 21 as the upstream data. In order for data to be transmitted to the next downstream part of the network, for example from the control node 5 to the third repeater node 4, a period equal to a time frame must be completed. For example, the period of time between the transmission of downstream data during the time slot TS4 and the transmission of down stream data in the time slot TS3 is the length of a time frame, i.e. $T_1$. Assuming time is counted at the beginning of the first frame, the time taken to propagate downstream data through the telecommunication system from the control node 5 to the mobile device 1 is $3T_1+2t_1$ ($3T_1$ to pass the data from the control node 5 to the first repeater node 2, and $2t_1$ to pass the data from the first repeater node 2, to the mobile device 1 in the final frame).

Figure 5:
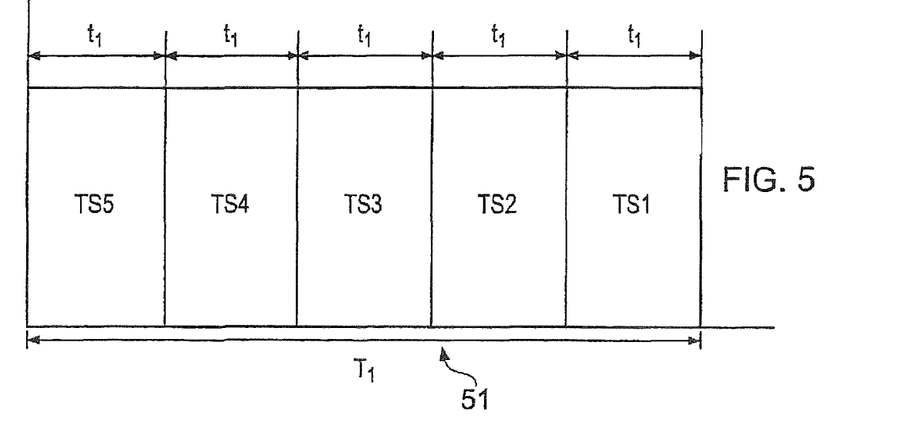
FIG. 5 shows a reversed time frame in accordance with the time frame of FIG. 2.

In order to overcome the increased delay in the propagation of downstream data, in some embodiments of the invention the telecommunications system is operable to reverse the order of the time frame 21. FIG. 5 shows a reversed time frame 51 which is the time frame 21 of FIG. 2, but reversed.

The time slots TS1 to TS5 correspond to the same parts of the telecommunications system as the time slots shown in FIG. 2.

Figure 6:
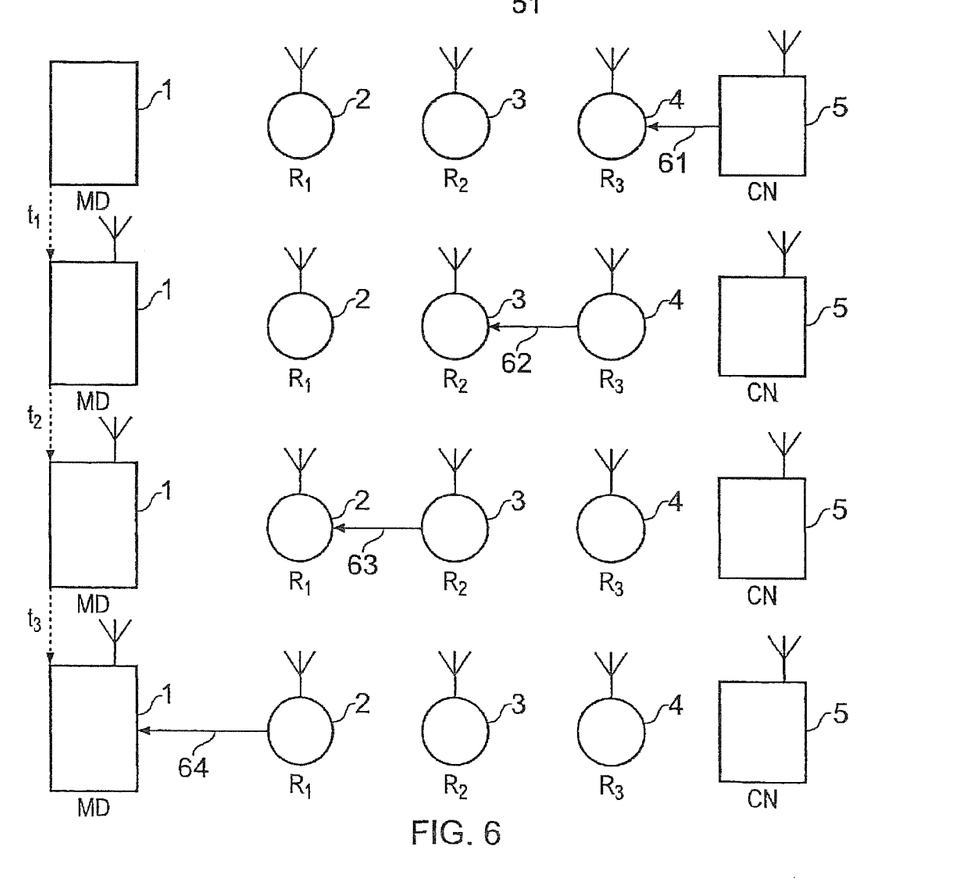
FIG. 6 shows a diagram illustrating the progression of downstream data through the telecommunication system of claim 1 in accordance with the time frame of FIG. 5.

FIG. 6 illustrates the progression of downstream data from the control node 5 to the mobile device 1 in accordance with the reversed time frame 51. The downstream data originates at the control node 5 and is transmitted to the third repeater node 4 during the time slot TS5 corresponding to the control node 5. This is shown by a first arrow 41. The downstream data is then transmitted to the second repeater node 3 during the time slot TS4 corresponding to the third repeater node 4. This is shown by a second arrow 62. The downstream data is then transmitted to the first repeater node 2 during the time slot TS3 corresponding to the second repeater node 3. This is shown by a third arrow 63. Finally the downstream data is transmitted to the mobile device 1 during the time slot TS2 corresponding to the first repeater node 2. This is shown by a fourth arrow 64.

Thus, using the reversed time frame 61, the period of time taken for the downstream data to be communicated between each part of the network is $t_1$ and the total time taken for the downstream data to be propagated from the control node 5 to the mobile device 1 is the length of one time frame i.e. $T_1$.

The ability to generate a reversed time frame allows for a choice as to whether to minimise a delay incurred in the communication of upstream data or to minimise a delay incurred in the communication of downstream data. Having this ability to reverse the order of the time frame provides several advantages in a number of applications. For example as explained above, in a case where under normal conditions it was appropriate to reduce a delay in the communication of data in one direction but occasionally a situation arose in which over a limited period of time it was more appropriate to reduce the delay for data to be transmitted in the other direction, by reversal of the time frame this could be accommodated.

Alternatively, the time frame could be reversed every other time frame. This would be to the effect that a round trip delay could be reduced. For example, data sent to the control node from the mobile device could be prioritised by ordering the time frame in favour of upstream data and then the next time frame reversed to favour downstream data so that a response of the control node to the data sent by the mobile device could be returned to the mobile device in thus providing a reduced round trip time. Furthermore, by reversing every other frame an average delay in both upstream and downstream data could be provided.

In another embodiment the system could be arranged such that upstream or downstream data was prioritised depending on a characteristic of data traffic which the system experiences. For example, data traffic being communicated across the system could be analysed over a period of a day with a view to identifying times at which there were peaks in data traffic in the upstream direction and peaks in traffic in the downstream direction. The telecommunication system could then be adapted to order the time frame, either reversed or non-reversed, in correspondence with the peaks in upstream or downstream data traffic.

Example Embodiment

Figure 7:
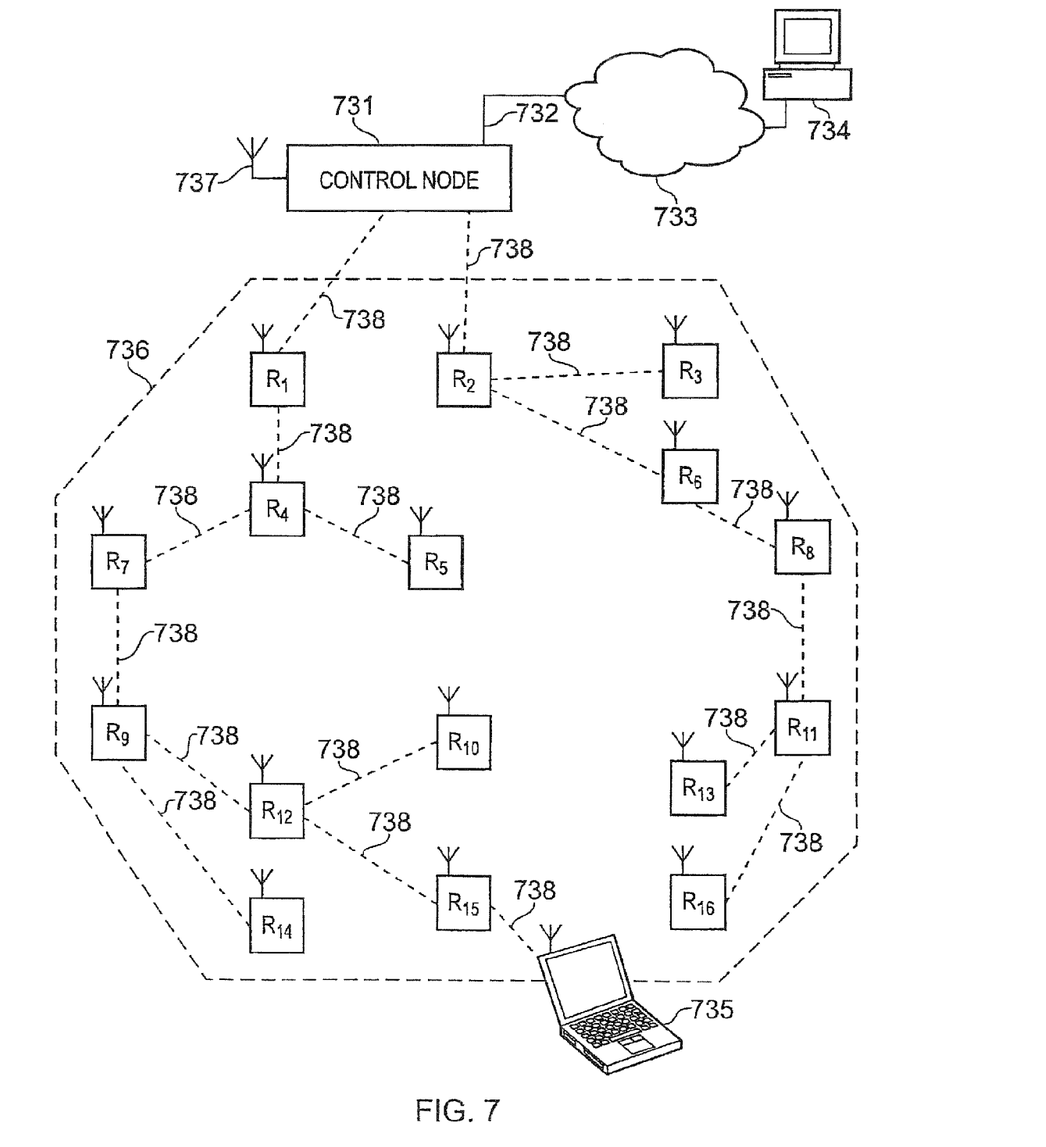
FIG. 7 shows an embodiment of the invention.

FIG. 7 provides a diagram of an embodiment of the present invention with a more complex network arrangement than that in FIG. 1. A network of repeater nodes 36 comprises repeater nodes $R_1$ to $R_{16}$. The repeater nodes may be wireless repeater nodes which communicate via a radio interface which may for example be a short-range spread spectrum radio interface based for example on IEEE 802.15.4. Additionally the repeater nodes may include their own power supplies and therefore not require a connection to a fixed mains supply. The control node 731 includes a wireless communication interface 737 in order to communicate with repeater nodes which are within range. The control node may be connected via an interface 732, such as Ethernet for example to a control interface 34 allowing the control node to be controlled by a user. The control interface might be a web interface operating on a personal computer. The control node 731 and the control interface 734 might be connected via a network 733 such as an IP network allowing a user remote operation of the control node 731. Each repeater node $R_1$ to $R_{16}$ is connected to its parent node via a radio communication link 738.

Configuring the Communication Network

When a repeater node joins the network it is operable to search for other repeater nodes with which it shares a potential for a communication link. This may take the form of a scan of all relevant radio frequencies. The joining repeater node is then operable to select a parent repeater node from all discovered nodes. A repeater node which has chosen a parent repeater node, becomes that parent repeater node's child repeater node. When the network is configured for the first time, each repeater node is operable to communicate a node identity associated with itself to the control node 731 and a request for a time slot. If the repeater node is within range of the control node 731 this might be communicated directly to the control node 731. However, if the repeater node is not within range of the control node 731, then the repeater node communicates its node identity and time slot request to its parent repeater node which will in turn communicate this identity onwards until the node identity reaches the control node. Upon receipt of the node identities the control node 731 is operable to maintain the representation of the topology for the communication network and allocate a time slot for each repeater node in accordance with the topology of the network. This is described below.

Allocation of Time Slots with the Time Frame.

Figure 8:
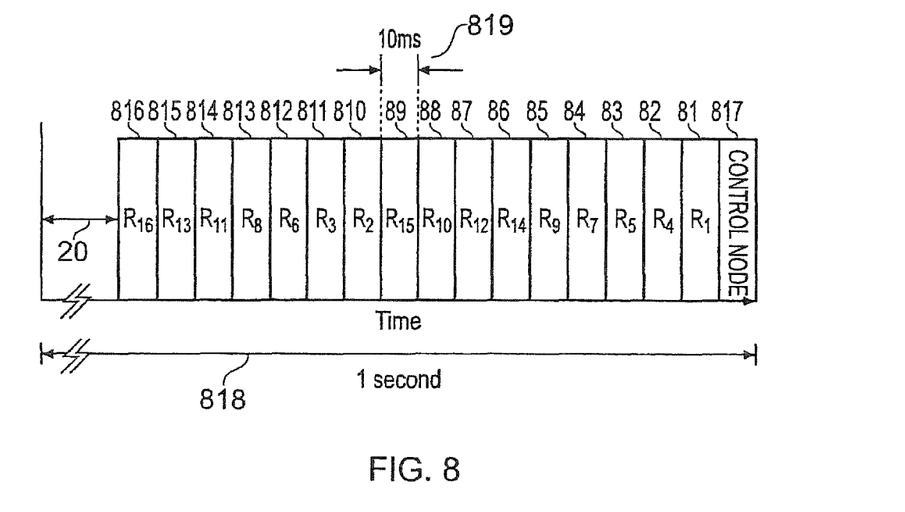
FIG. 8 shows a time frame in accordance with the embodiment of FIG. 7.

FIG. 8 shows a time frame in accordance with the embodiment shown in FIG. 7. The time slots are allocated to the repeater nodes to the effect that each repeater node transmits to another repeater node in one of the upstream or the downstream directions in a time slot which is a minimal time from the time slot in which the other repeater node transmits in the upstream or downstream direction. Thus the repeater nodes ($R_1$ to $R_{17}$) are allocated time frames 81, 82, 83, 84, 85, 86, 87, 88, 89, 810, 811, 812, 813, 814, 815, 816 such that there is a minimal time separation between a time slot of a parent repeater node and those of the corresponding child repeater nodes.

In this embodiment the frame interval 818 of the time frame is 1 second and a duration 819 of a time slot is 10 ms. Therefore, the network of repeater nodes could potentially expand to include 99 repeater nodes.

Should the mobile terminal 735 send data to repeater node $R_{15}$, it will be possible to communicate this data to the control node 31 at a minimum within the space of one frame interval (1 second) and at a maximum of two frame intervals (2 seconds). This is shown in FIG. 9.

Figure 9:
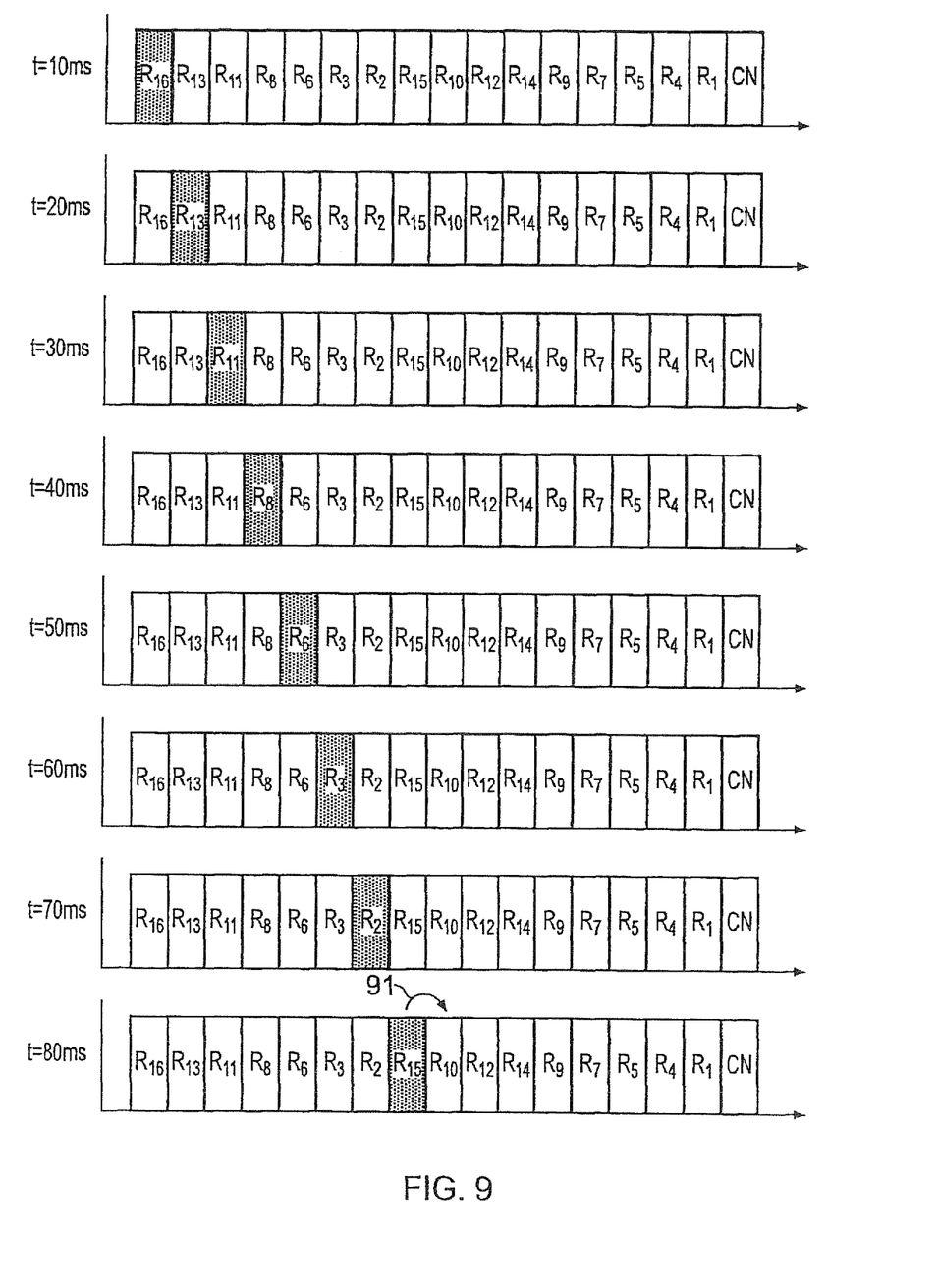
FIG. 9 shows an illustration of the time frame of FIG. 8 on a time slot by time slot basis.

FIG. 9 shows the time frame of FIG. 8 being stepped through time slot by time slot. At t=80 ms repeater node $R_{15}$ transmits its upstream data during its timeslot to its parent repeater node, repeater node $R_{12}$, this is shown by an arrow 91.

At t=100 ms repeater node $R_{12}$ transmits its upstream data during its timeslot to its parent node, repeater node $R_9$, this is shown by an arrow 92.

At t=120 ms repeater node $R_9$ transmits its upstream data during its timeslot to its parent node, repeater node $R_7$, this is shown by an arrow 93.

At t=130 ms repeater node $R_7$ transmits its upstream data during its timeslot to its parent node, repeater node $R_1$, this is shown by an arrow 94.

At t=160 ms repeater node $R_1$ transmits its upstream data during its timeslot to its parent node, the control node 31 this is shown by an arrow 95.

In some embodiments, should a new repeater node join the communication network 736, after it has been configured, the control node 731 is operable to assign the new repeater node a time slot such that there is a minimal time separation between a time slot of the new repeater node's parent repeater node and the newly allocated time slot.

Frame Reversal

As discussed above, organising the time slots of the time frame such that a delay in the communication of data in the network is reduced in one direction is at the expense of the time taken to transmit downstream data through the network. For example, in the embodiment of FIG. 7 in which the time frame of FIG. 8 is used, should data, for example control data, be sent from the control node 31 to the mobile device 35 via repeater node $R_{15}$, it would take the repetition of at least 7 frame intervals and thus take at least 7 seconds to reach the mobile device 735.

However, in some examples of the present invention, the system is operable to reverse the order of the time slots 71, 72, 73, 74, 75, 76, 77, 78, 79, 710, 711, 712, 713, 714, 715, 716 in the timeframe at a specified frequency, for example every second frame. Such a reversal would result in the same reduction in time delay that benefits the transmission of upstream data, as described above, being applied to the transmission of downstream data.

Figure 10:
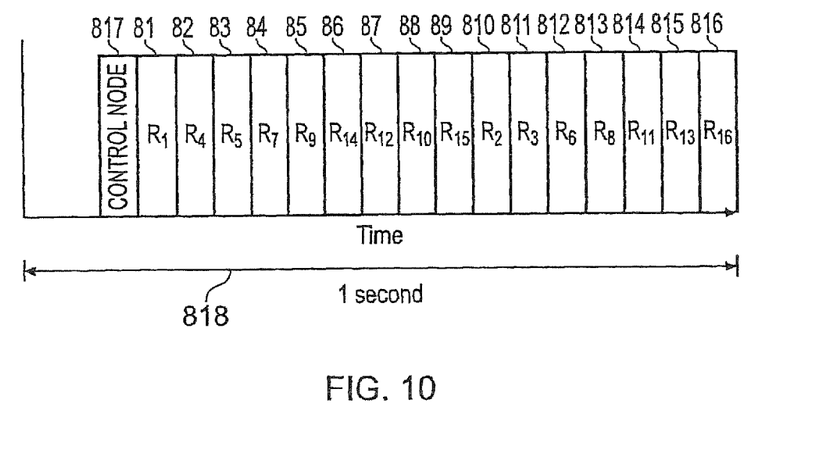
FIG. 10 shows a reversed time frame in accordance to the time frame of FIG. 8.

FIG. 10 shows the time frame of FIG. 8 except reversed in order to reduce the time delay encountered in the transmission of downstream data. For example, should the control node 731 communicate data to the mobile device 735 of FIG. 7, this data could be transmitted in a minimum of one time frame interval 818, i.e. 1 second and at a maximum of two frame intervals (2 seconds): the control node 31 transmits its downstream data during its timeslot 817 to its child node, repeater node $R_4$, repeater node $R_4$ transmits its downstream data during its timeslot 82 to its parent child node, repeater node $R_7$, repeater node $R_7$ transmits its downstream data during its timeslot 84 to its child node, repeater node $R_9$, repeater node $R_9$ transmits its downstream data during its timeslot 85 to its child node, repeater node $R_{12}$, and repeater node $R_{12}$ transmits its downstream data during its timeslot 87 to its child node, repeater node $R_{15}$.

In some examples the frequency at which the timeslots of the time frames are reversed may be set depending on data traffic conditions. For example, should the control node 731 transmit control data to the entire network of repeater nodes 736 at set intervals, perhaps every 10 frames, then the flame reversal could be set to occur at the repetition of every 10th frame.

Various modifications may be made to the embodiments herein before described. For example, in some embodiments the arrangement of the plurality of repeater nodes may be sufficiently simple that a reduction of a delay in transmitting data through the system is realised by the use of a time frame without a need to order the time slots. Furthermore, although embodiments of the invention have been described with reference to nodes which transmit data via a wireless interface, embodiments of the invention would find equal application using communication schemes in which communication between nodes is achieved using a non-wireless interface for example a wired Ethernet connection.

The invention claimed is:

1. A telecommunications system, for communicating data to and from a mobile device, the system comprising a plurality of repeater nodes and a control node, each repeater node having a transceiver unit configured to transmit and to receive data to or from one or more other of the repeater nodes or the control node or the mobile device, wherein the control node is configured to transmit data in a downstream direction from the control node to the mobile device via the repeater nodes and to receive data from the mobile device transmitted in an upstream direction from the mobile device to the control node via the repeater nodes, and the control node, the mobile device and the plurality of repeater nodes are arranged to communicate the data in the downstream direction from the control node to the mobile device via the repeater nodes using a time frame divided into a plurality of time slots, and to communicate the data in the upstream direction from the mobile device to the control node via the repeater nodes using the time frame, wherein the control node is configured to allocate each of the repeater nodes a time slot of the time frame for transmitting to another one of the repeater nodes in one of the upstream or the downstream directions;

the processor of each repeater node is configured to receive the time slot from the control node and to control the repeater node to transmit data in its allocated time slot;

the control node, the mobile device and the plurality of repeater nodes are arranged to reverse the order of the time slots in one time frame with respect to the order of the time slots in another time frame, so as to prioritize either upstream data communication or downstream data communication; and one or more of the repeater nodes are powered from independent power sources.

2. A telecommunications system according to claim 1, wherein the system is configured to reverse the order of the time slots of one time frame in respect to another time frame after the completion of every time frame.

3. A telecommunications system according to claim 1, wherein the system is configured to reverse the order of the time slots dependent upon a characteristic of the data traffic which the system experiences.

4. A telecommunication system according to claim 1, wherein the system is configured to reverse the order of the time slots after the completion of a predetermined number of time frames.

5. A method for communicating data from and to a mobile device via a plurality of repeater nodes, the method comprising the steps of transmitting data in a downstream direction from a control node to the mobile device via the repeater nodes, and receiving data from the mobile device transmitted in an upstream direction from the mobile device to the control node via the repeater nodes, wherein the transmitting of the data in the downstream direction from the control node to the mobile device via the repeater nodes includes transmitting in accordance with a time frame divided into a plurality of time slots, and the receiving of the data in the upstream direction at the control node from the mobile device via the repeater nodes includes transmitting in the slots of the time frame, and the method includes allocating each of the repeater nodes a time slot of the time frame for transmitting to one of the other repeater nodes in one of the upstream or the downstream directions, controlling the repeater nodes to transmit data in the allocated time slot, reversing the order of time slots in one time frame with respect to the order of time slots in another time frame, so as to prioritize either upstream data communication or downstream data communication, and providing power to one or more of the repeater nodes from independent power sources.

6. A method as claimed in claim 5, including the steps of reversing the order of the time slots of one time frame in respect to another time frame after the completion of every time frame.

7. A method as claimed in claim 5, including the steps of reversing the order of the time slots dependent upon a characteristic of the data traffic to be transmitted.

8. A method as claimed in claim 5, including the steps of reversing the order of the time slots after the completion of a predetermined number of time frames.

9. A repeater node configured to communicate data in a system according to claim 1, the repeater node comprising:

a transceiver unit configured to transmit and receive data to or from one or more other repeater nodes or a control node or a mobile device;

and a processor configured to control the transceiver unit; and a power source configured to provide power to the transceiver unit and the processor;

in which the transceiver units of the repeater nodes are configured:

to communicate data in a downstream direction, the downstream direction being from the control node to the mobile device, and to communicate data in an upstream direction, the upstream direction being from the mobile device; and to communicate the data using a time frame divided into a plurality of time slots, so that each of the repeater nodes communicates data during a respective one of the time slots in one of the upstream or the downstream directions to another of the repeater nodes; and the time slots are arranged amongst the repeater nodes in one of an order which prioritizes either upstream data communication or downstream data communication, wherein the power source is an independent power source.

10. A control node configured to communicate data to and from a mobile device in a system according to claim 1, wherein the control node is configured to transmit data in a downstream direction from the control node to a mobile device or to a repeater node for transmission on to the mobile device and to receive data from the mobile device transmitted in an upstream direction from the mobile device or received from a repeater node to which the data has been transmitted from another repeater node or mobile device;

the control node is arranged to communicate the data in the downstream direction from the control node to the mobile device via one or more repeater nodes using a time frame divided into a plurality of time slots, and to receive data communicated in the upstream direction from the mobile device to the control node via the repeater nodes using the time frame;

the control node is configured to allocate time slots of the time frame to the repeater nodes to the effect that each of the repeater nodes transmits to another repeater node in one of the upstream or the downstream directions in a time slot of the time frame; and the control node is configured to reverse the order of the time slots in one time frame with respect to the order of the time slots in another time frame, so as to prioritize either upstream data communication or downstream data communication.

* * * * *